US012469934B2

United States Patent
DeKeuster et al.

(10) Patent No.: US 12,469,934 B2
(45) Date of Patent: *Nov. 11, 2025

(54) BATTERY MODULE HAVING A SENSOR WELDING TAB

(71) Applicant: CPS TECHNOLOGY HOLDINGS LLC, New York, NY (US)

(72) Inventors: Richard M. DeKeuster, Racine, WI (US); Xugang Zhang, Shorewood, WI (US); Abed Al Fattah Isam Shafie, Glendale, WI (US); Christopher M. Bonin, South Milwaukee, WI (US); John P. Dinkelman, South Milwaukee, WI (US); Jennifer L. Czarnecki, Franklin, WI (US)

(73) Assignee: CPS Technology Holdings LLC, New York, NY (US)

( * ) Notice: Subject to any disclaimer, the term of this patent is extended or adjusted under 35 U.S.C. 154(b) by 769 days.

This patent is subject to a terminal disclaimer.

(21) Appl. No.: 17/430,947

(22) PCT Filed: Feb. 14, 2020

(86) PCT No.: PCT/US2020/018310
§ 371 (c)(1),
(2) Date: Aug. 13, 2021

(87) PCT Pub. No.: WO2020/168206
PCT Pub. Date: Aug. 20, 2020

(65) Prior Publication Data
US 2022/0131202 A1 Apr. 28, 2022

Related U.S. Application Data

(60) Provisional application No. 62/806,387, filed on Feb. 15, 2019.

(51) Int. Cl.
*H01M 10/48* (2006.01)
*H01M 50/505* (2021.01)
(Continued)

(52) U.S. Cl.
CPC ....... *H01M 50/519* (2021.01); *H01M 10/486* (2013.01); *H01M 50/505* (2021.01);
(Continued)

(58) Field of Classification Search
CPC .................................................. H01M 50/519
(Continued)

(56) References Cited

U.S. PATENT DOCUMENTS

2011/0264318 A1* 10/2011 Laforge ................. B60L 50/60
701/22
2013/0101883 A1 4/2013 Zhao
(Continued)

FOREIGN PATENT DOCUMENTS

CN 206003858 U 3/2017
CN 107403889 A 11/2017
(Continued)

OTHER PUBLICATIONS

International Search Report and Written Opinion of the International Searching Authority dated Apr. 22, 2020 for PCT/US2020/018310 filed Feb. 14, 2020, 15 pages.
(Continued)

*Primary Examiner* — Yalkew Fantu
(74) *Attorney, Agent, or Firm* — Boardman & Clark LLP

(57) ABSTRACT

A battery module includes electrochemical cells having an electrochemical cell with a terminal end. The battery module also includes a bus bar carrier configured to interface bus bars with terminals of the electrochemical cells and having a window. The battery module also includes a flex circuit disposed on the bus bar carrier, and a temperature sensor
(Continued)

welding tab of the flex circuit. The temperature sensor welding tab includes a circuit engagement region coupled to the flex circuit, a welding region coupled to the terminal end of the first electrochemical cell, and a transverse region extending through the window of the bus bar carrier and between the circuit engagement region and the welding region.

15 Claims, 6 Drawing Sheets

(51) Int. Cl.
  *H01M 50/507* (2021.01)
  *H01M 50/519* (2021.01)
  *H01M 50/55* (2021.01)
  *H01M 50/569* (2021.01)

(52) U.S. Cl.
  CPC ......... *H01M 50/507* (2021.01); *H01M 50/55* (2021.01); *H01M 50/569* (2021.01); *H01M 2220/20* (2013.01)

(58) Field of Classification Search
  USPC ........................................................ 320/134
  See application file for complete search history.

(56) References Cited

U.S. PATENT DOCUMENTS

| | | | |
|---|---|---|---|
| 2015/0069829 A1* | 3/2015 | Dulle | H01M 50/528 307/9.1 |
| 2016/0197328 A1* | 7/2016 | Mack | H01M 50/516 429/121 |
| 2018/0019451 A1 | 1/2018 | Zhao et al. | |
| 2019/0126775 A1* | 5/2019 | Han | B60L 3/12 |
| 2021/0098765 A1* | 4/2021 | Weinberger | H01M 50/519 |

FOREIGN PATENT DOCUMENTS

| | | |
|---|---|---|
| CN | 207779574 U | 8/2018 |
| CN | 207781834 U | 8/2018 |
| CN | 208026382 U | 10/2018 |
| WO | 2018124494 A2 | 7/2018 |

OTHER PUBLICATIONS

International Preliminary Report on Patentability of the International Searching Authority dated Aug. 26, 2021 for PCT/US2020/018310 filed Feb. 14, 2020, 7 pages.

* cited by examiner

BATTERY MODULE HAVING A SENSOR WELDING TAB

CROSS-REFERENCE TO RELATED APPLICATIONS

This application is a national phase filing of International Patent Application No. PCT/US2020/018310 entitled "Sensor for Battery Module," which has an international filing date of Feb. 14, 2020, and claims priority to U.S. provisional patent application No. 62/806,387 filed Feb. 15, 2019, the entire contents of each of which are hereby incorporated by reference herein for all purposes.

FIELD

The present disclosure relates generally to the field of batteries and battery modules. More specifically, the present disclosure relates to a sensor for use with a battery module.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional battery module configurations, temperature sensing components may be coupled to a processor of the traditional battery module, such that the processor receives or determines data indicative of a temperature of various portions of the traditional battery module.

Unfortunately, integrating traditional temperature sensing components in traditional battery modules may be cumbersome and expensive, and may lead to undesirable affects, such as inaccurate temperature measurements. Accordingly, improved temperature sensors and integration features are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present embodiments are directed to a battery module. The battery module includes electrochemical cells having an electrochemical cell with a terminal end. The battery module also includes a bus bar carrier configured to interface bus bars with terminals of the electrochemical cells and having a window. The battery module also includes a flex circuit disposed on the bus bar carrier, and a temperature sensor welding tab of the flex circuit. The temperature sensor welding tab includes a circuit engagement region coupled to the flex circuit, a welding region coupled to the terminal end of the first electrochemical cell, and a transverse region extending through the window of the bus bar carrier and between the circuit engagement region and the welding region.

Disclosed is a battery module, comprising a plurality of electrochemical cells including a first electrochemical cell having a terminal end; a bus bar carrier configured to interface bus bars with terminals of the plurality of electrochemical cells, and having a window; a flex circuit disposed on the bus bar carrier; and a temperature sensor welding tab of the flex circuit, wherein the temperature sensor welding tab comprises a circuit engagement region coupled to the flex circuit, a welding region coupled to the terminal end of the first electrochemical cell, and a transverse region extending through the window of the bus bar carrier and between the circuit engagement region and the welding region. Further disclosed is a battery module wherein the welding region is coupled to the terminal end of the first electrochemical cell by welding.

Disclosed herein is a battery module comprising: a first electrochemical cell; a circuit; a sensor welding tab having a first region coupled to the circuit and a second region coupled to the first electrochemical cell. Further disclosed is a battery module wherein the sensor welding tab is coupled to the first electrochemical cell by welding. Further disclosed is a battery module wherein the circuit is disposed of on a bus bar carrier having a bottom surface. Further disclosed is a battery module wherein the sensor welding tab second region is disposed below a bottom surface of the bus bar carrier. Further disclosed is a battery module wherein the sensor welding tab comprises a third region extending transversely between the first region and the second region. Further disclosed is a battery module wherein the circuit comprises a flex circuit. Further disclosed is a battery module wherein the battery module further comprises a bus bar carrier having a window, the sensor welding tab extending through the window. Further disclosed is a battery module wherein the first electrochemical cell is disposed at least partially below the bus bar carrier. Further disclosed is a battery module wherein the sensor welding tab comprises a temperature sensor. Further disclosed is a battery module wherein the temperature sensor is a thermistor.

Disclosed herein is a battery module comprising: an electrochemical cell; a bus bar carrier having a window; a circuit disposed on the bus bar carrier; and a sensor welding tab comprising a circuit engagement region coupled to the circuit, a welding region coupled to the electrochemical cell, and a transverse region extending through the window of the bus bar carrier and between the circuit engagement region and the welding region. Further disclosed is a battery module wherein the electrochemical cell comprises a terminal end and the welding region is coupled to the terminal end of the electrochemical cell. Further disclosed is a battery module wherein the sensor welding tab is a temperature sensor welding tab. Further disclosed is a battery module wherein the welding region is welded to the electrochemical cell. Further disclosed is a battery module wherein the circuit is a flex circuit.

These and other features and advantages of devices, systems, and methods are described in, or are apparent from, the following detailed descriptions and drawings of various examples of embodiments.

DRAWINGS

Figure 1:
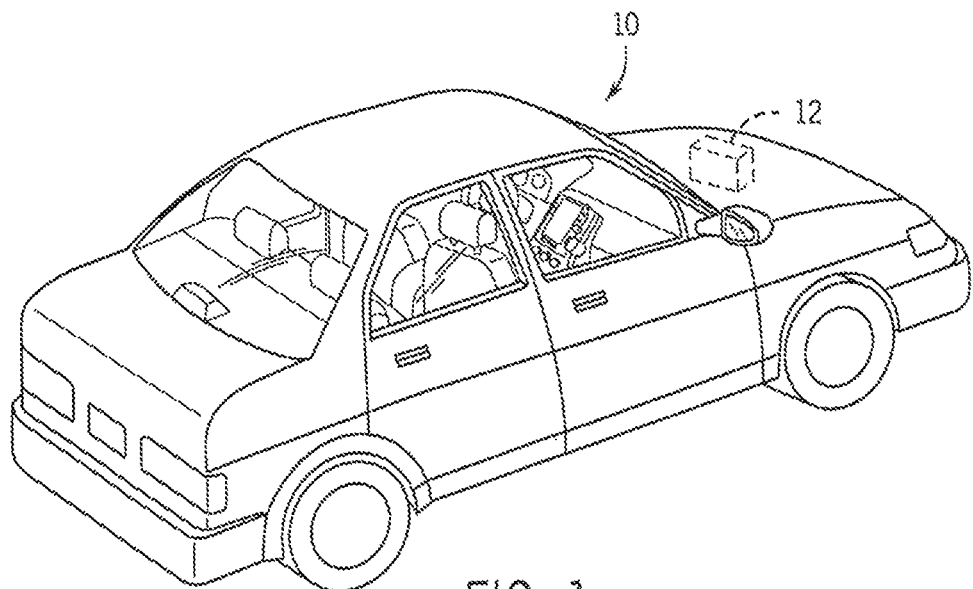
FIG. 1 is a perspective view of a vehicle having a battery system configured in accordance with present embodiments to provide power for various components of the vehicle.

It should be understood that the drawings are not necessarily to scale. In certain instances, details that are not necessary to the understanding of the invention or render other details difficult to perceive may have been omitted. For ease of understanding and simplicity, common numbering of elements within the numerous illustrations is utilized when the element is the same in different Figures. It should be understood, of course, that the invention is not necessarily limited to the particular embodiments illustrated herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, a battery module (e.g., a lithium-ion [Li-ion] battery module) may include a housing in which electrochemical cells (e.g., Li-ion electrochemical cells) are disposed, and in which a bus bar carrier is disposed. The bus bar carrier my include bus bars, among other components, disposed thereon, and the bus bar carrier may be configured to enable alignment of the bus bars with appropriate terminals of the electrochemical cells. A circuit which may be a flex circuit may be disposed on the bus bar carrier and include features configured to interface with the bus bars and/or with the electrochemical cells. The flex circuit may include a flexible base material, such as polyamide. However, components having non-polyamide (or non-flexible) materials, such as metallic or other components, may be integrated with the flexible (e.g., polyamide) material of the flex circuit.

In accordance with present embodiments, a sensor tab may be integrated within a circuit for use with the disclosed battery module. In various embodiments, the sensor tab may be one component integrated with the flexible material (e.g., polyamide) of the flex circuit. For example, the sensor tab may be a temperature sensor welding tab which may be integrated with the flex circuit via a hot-melt adhesive, a different adhesive, overmolding, or via other coupling techniques. The flex circuit may be disposed along an upper surface of the bus bar carrier, and the temperature sensor welding tab of the flex circuit may be disposed on the flex circuit in a location of the bus bar carrier that enables the temperature sensor welding tab to extend through an opening, or window, in the bus bar carrier. The window may enable the temperature sensor welding tab of the flex circuitry to physically access one of the electrochemical cells disposed in the housing and adjacent an underside surface of the bus bar carrier. The temperature sensor welding tab may extend through the window and may be welded or otherwise adhered to a surface (e.g., a terminal end) of the electrochemical cell.

The sensor tab, which may be referred to herein as a temperature sensor welding tab, may also include thermistors, or may be disposed adjacent an area of the flex circuit which includes the thermistors. When the temperature sensor welding tab is adhered (e.g., welded) to the surface of the electrochemical cell, the welded connection may bring the thermistors into close proximity to, or in contact with, the surface of the electrochemical cell. The thermistors may be communicatively coupled with the processor of the battery module via electrical wires embedded in the flex circuitry and extending toward an electrical contact with the processor. Thus, upon welding the temperature sensor welding tab to the surface of the electrochemical cell, the thermistors and corresponding signals may be utilized by the processor to determine a temperature of the surface of the electrochemical cell. Features of the flex circuit, such as notches in the flex circuit disposed adjacent the temperature sensor welding tab, may facilitate improved coupling of the temperature sensor welding tab to the electrochemical cell, which may enable improved temperature detection over traditional embodiments. These and other features will be described in detail below with reference to the drawings.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system.

For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
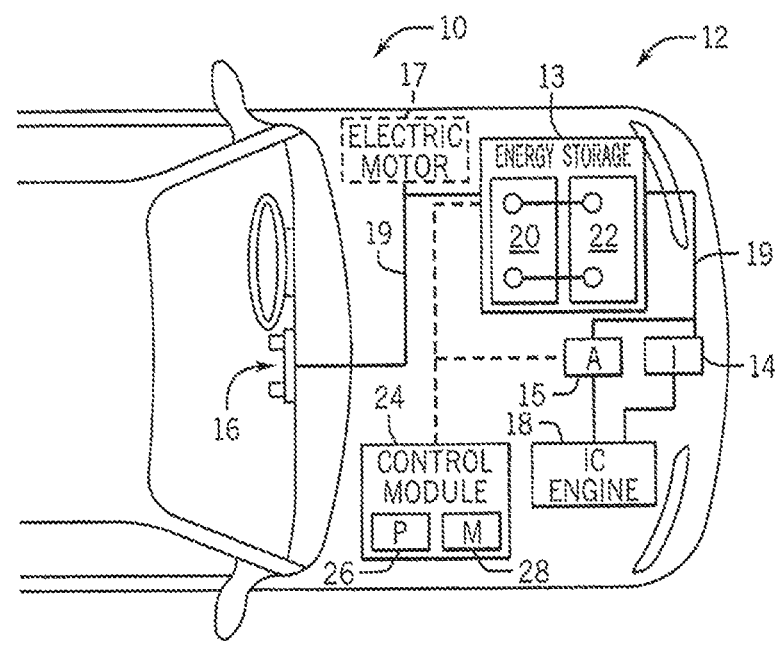
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy.

Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12-volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/ or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random-access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
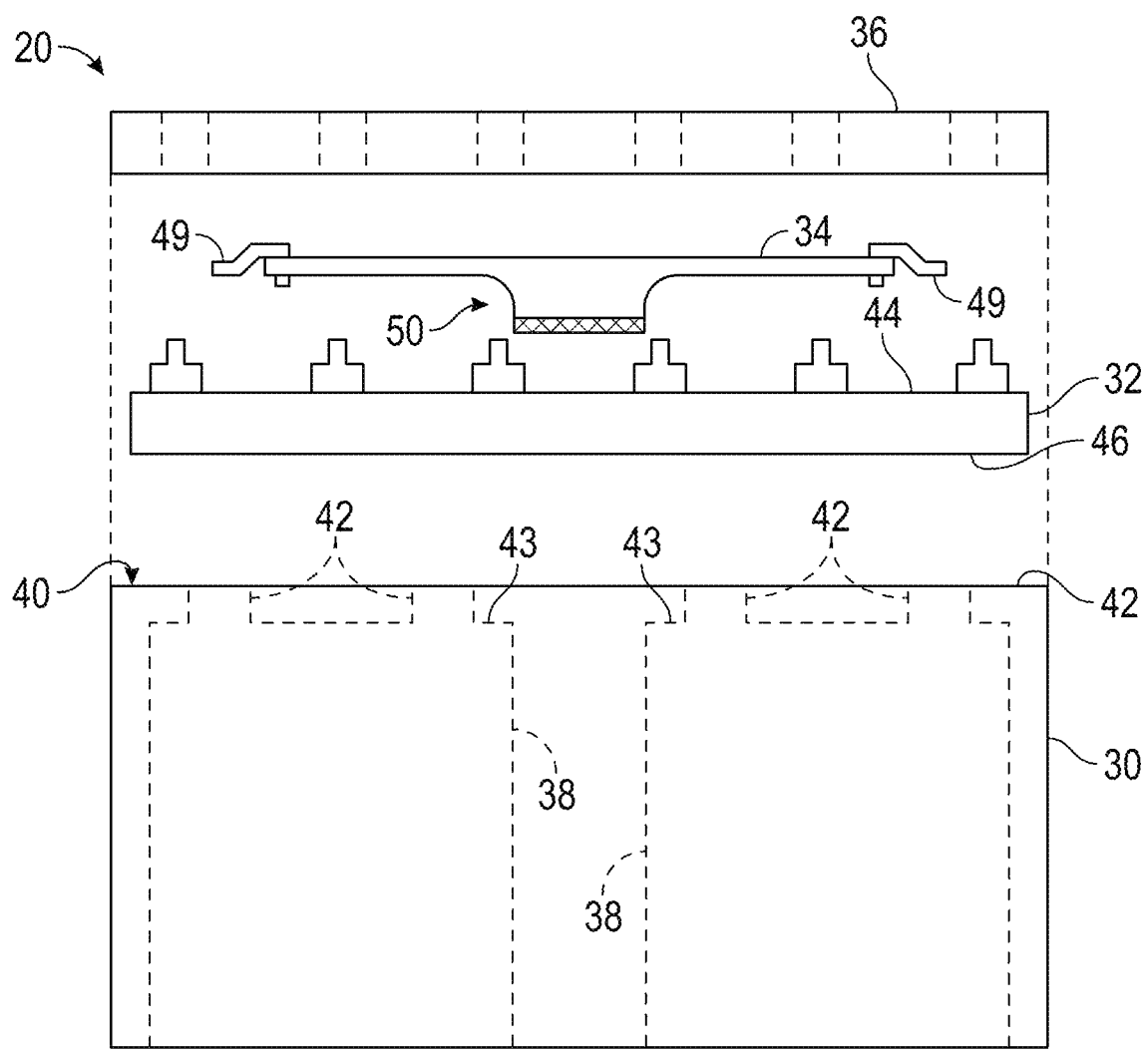
FIG. 3 is an exploded side view of an embodiment of a battery module for use in the vehicle of FIG. 1, in accordance with an aspect of the present disclosure.

FIG. 3 is an exploded side view of an embodiment of the battery module 20 for use in the vehicle 10 of FIG. 1. For simplicity, not all components of the battery module 20 are illustrated (e.g., terminals, bus bars, sensors, etc.). The battery module 20 (e.g., lithium-ion (Li-ion) battery module) includes a housing 30 (e.g., plastic housing), a bus bar carrier 32, a flex circuit 34, and a cover 36. A plurality of electrochemical cells 38 (e.g., Li-ion electrochemical cells) are disposed within the housing 30, and are shown via dashed lines in the illustrated embodiment to indicate that they are within the illustrated housing 40 (i.e., behind a wall of the housing 40 in the illustrated perspective). In certain embodiments, the battery module 20 may include any number of electrochemical cells 38 (e.g., 2, 3, 4, 5, 6, 7, 8, 9, 10, or more electrochemical cells), any type of electrochemical cell 38 (e.g., Li-ion, lithium polymer, lead-acid, nickel cadmium, or nickel metal hydride, prismatic, and/or cylindrical), and any arrangement of the electrochemical cells 38 (e.g., stacked, separated, or compartmentalized).

The housing 30 includes an opening 40 on one side 42 (upper side or face) to receive the electrochemical cells 38. The bus bar carrier 32 may be disposed within the opening 40 and above the electrochemical cells 38 and may include bus bars disposed thereon configured to interface with terminals 42 extending from terminal ends 43 of the electrochemical cells 38. That is, although the bus bars are not shown in the illustrated embodiment, the bus bars may be disposed in locations of the bus bar carrier 32 suitable for coupling the bus bars to the terminals 42 of the electrochemical cells 38. The bus bar carrier 32 may also include the circuit (for example, flex circuit) 34 disposed thereon. For example, the bus bar carrier 32 may be disposed on an upper side 44 of the bus bar carrier 32 opposing an underside 46 of the bus bar carrier 32. The flex circuit 34 in the illustrated embodiment is coupled to the upper side 44 of the bus bar carrier 32. The flex circuitry 34 may include a flexible material, such as a polyamide material, within which (and from which) electrical components extend. The electrical components of the flex circuit 34 may be configured to interface with the bus bars and/or with the terminal ends 43 of the electrochemical cells 38. For example, as will be appreciated in view of further discussion below, the flex circuit 34 may include voltage sensing tabs configured to contact bus bars of the battery module 20, and temperature sensor welding tabs 49 configured to contact the terminal ends 43 of certain ones of the electrochemical cells 38. Each temperature sensor welding tab 49 may include a metal material, such as aluminum, and may be configured to be welded (e.g., from overhead) to the terminal end 43 of one of the electrochemical cells 32. The flex circuit 34 may also include electrical contacts 50 extending toward other features disposed in the housing 40, such as a processor of the battery module 20 or an electrical path to the processor.

The voltage sensing tabs and the sensor tabs (for example, temperature sensor welding tabs) 49 may be strategically positioned on the flex circuit 34, and the flex circuit 34 may be strategically positioned on the bus bar carrier 32, to enable coupling of the voltage sensing tabs and the temperature sensor welding tabs 49 of the flex circuit 34 with the appropriate features of the battery module 20. Aspects of the temperature sensor welding tabs 49 will be described in detail below with reference to later drawings.

Figure 4:
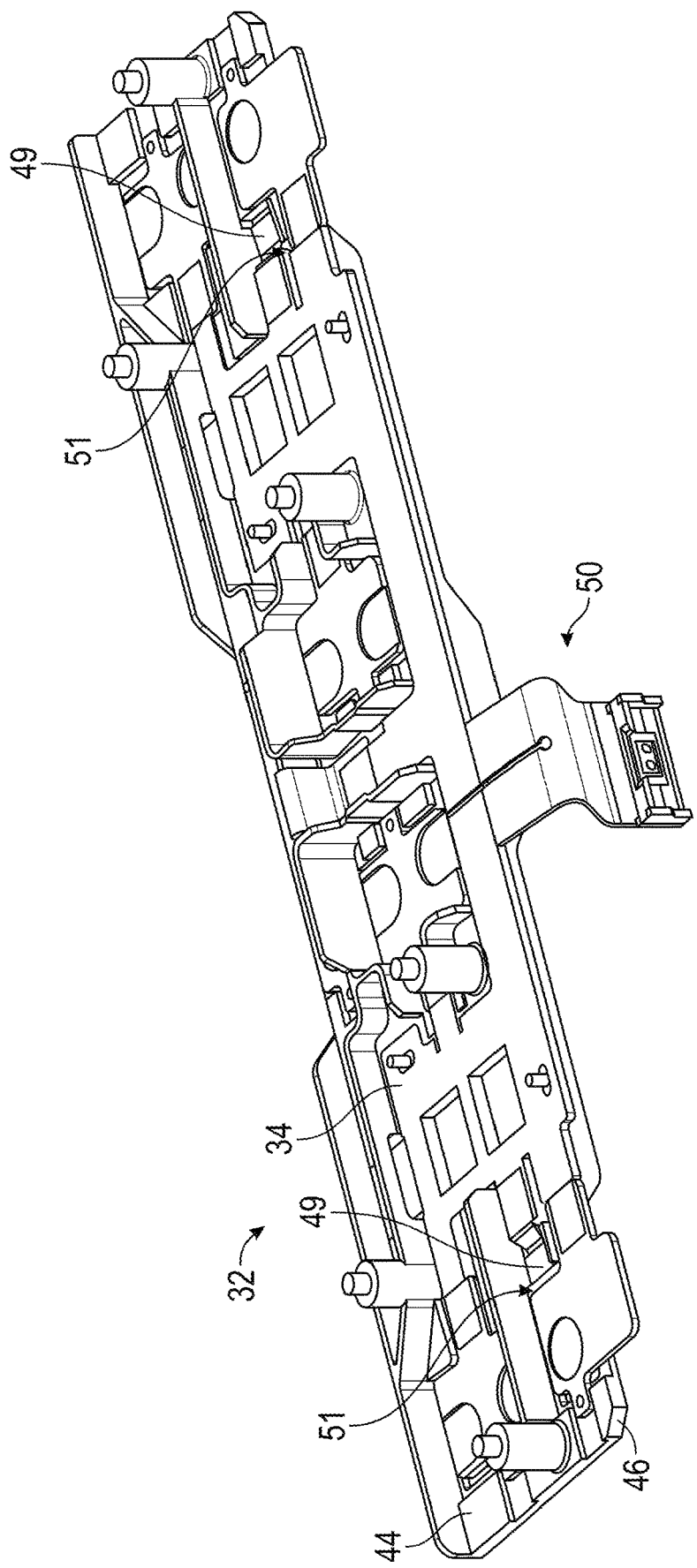
FIG. 4 is a perspective view of a bus bar carrier having a flex circuit, for use in the battery module of FIG. 3, in accordance with an aspect of the present disclosure.

FIG. 4 is a perspective view of the bus bar carrier 32 having the flex circuit 34 illustrated in the battery module 20 of FIG. 3. As previously described, the flex circuit 34 may include a thin layer of flexible material, such as polyamide. The flex circuit 34 may include various electrical components disposed in and/or extending from the polyamide material of the flex circuit 34. For example, electrical wiring may be embedded within the polyamide material of the flex circuit 34 and may extend between various electrical components of the flex circuit 34. In the illustrated embodiment, the flex circuit 34 includes, for example, two temperature sensor welding tabs 49 extending from edges of the flex circuit 34, among other electrical components.

Figure 5:
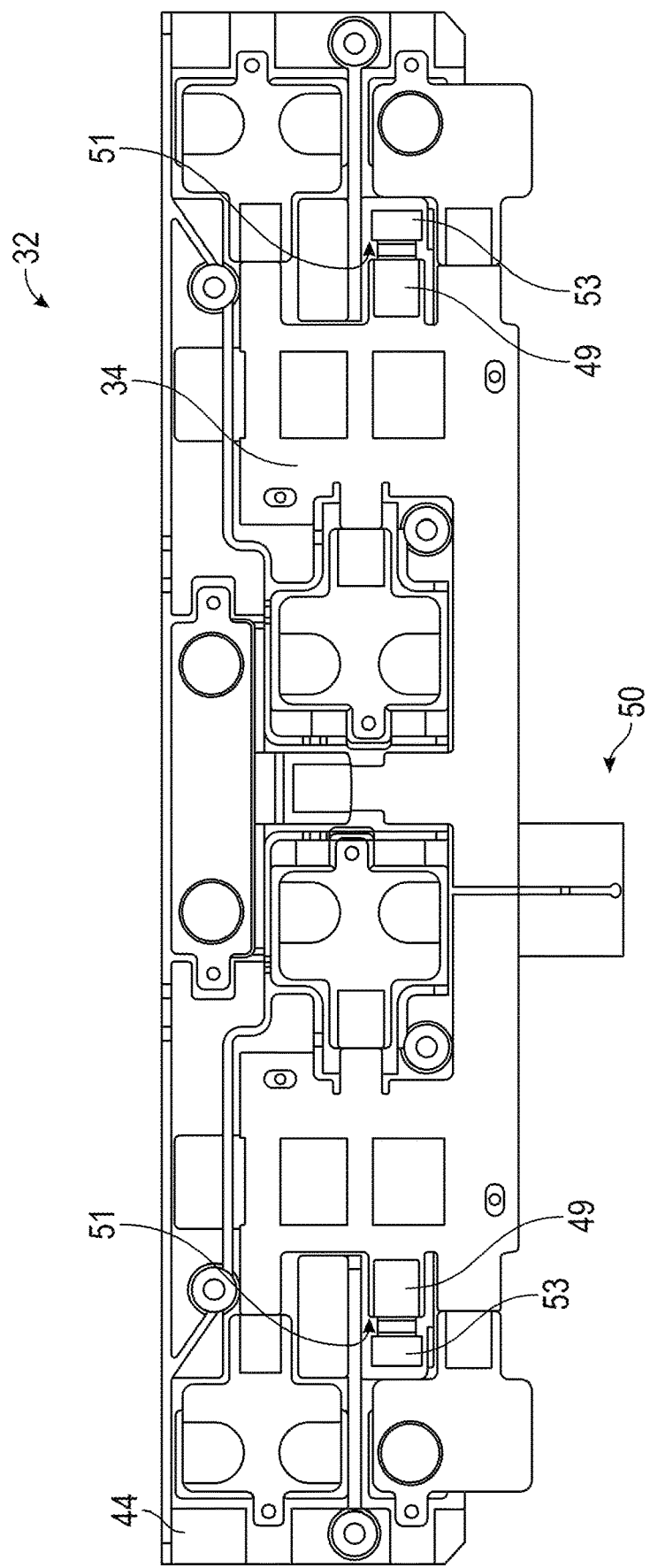
FIG. 5 is a top view of the bus bar carrier and flex circuit of FIG. 4, in accordance with an aspect of the present disclosure.

The temperature sensor welding tabs 49 are disposed on portions of the flex circuit 34 that, when the flex circuit 34 is disposed on the bus bar carrier 32, cause the temperature sensor welding tabs 49 to extend through openings, or windows 51, in the bus bar carrier 32. The windows 51 may extend, for example, from the upper side 44 of the bus bar carrier 32 to the underside 46 of the bus bar carrier 32. That is, the windows 51 extend entirely through a thickness of the bus bar carrier 32. The windows 51 enable the temperature sensor welding tabs 49 to extend from the flex circuit 34 disposed on the upper side 44 of the bus bar carrier 32 into contact with features (e.g., terminal ends of electrochemical cells) disposed adjacent (e.g., under) the underside 46 of the bus bar carrier 32. The windows 51 also enable an unobstructed view of the temperature sensor welding tabs 49 from above the bus bar carrier 32. For example, FIG. 5 is a top view of the bus bar carrier 32 and the flex circuit 34 of FIG. 4. As shown, each temperature sensor welding tab 49 includes a welding region 53 that is unobstructed from view. The welding region 53 may be welded or otherwise adhered to, for example, a terminal end of an electrochemical cell disposed underneath the bus bar carrier 32.

Figure 6:
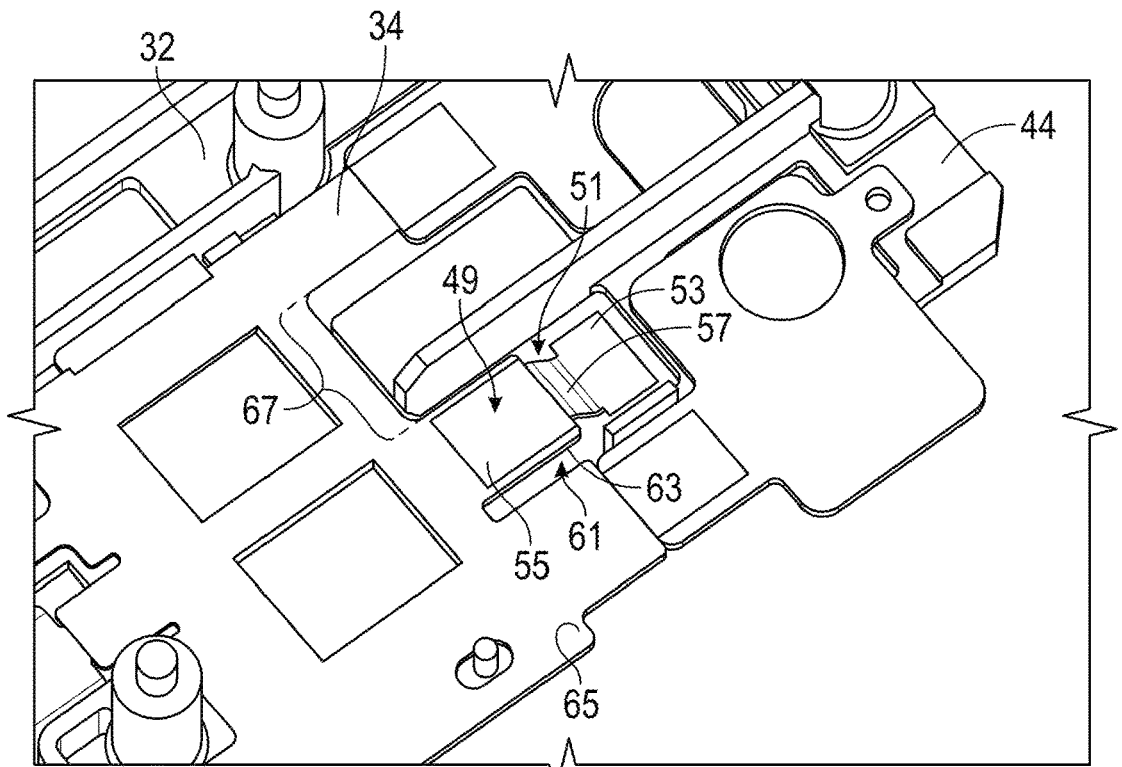
FIG. 6 is a perspective view of a portion of the bus bar carrier and flex circuit of FIG. 4, in accordance with an aspect of the present disclosure.
Figure 7:
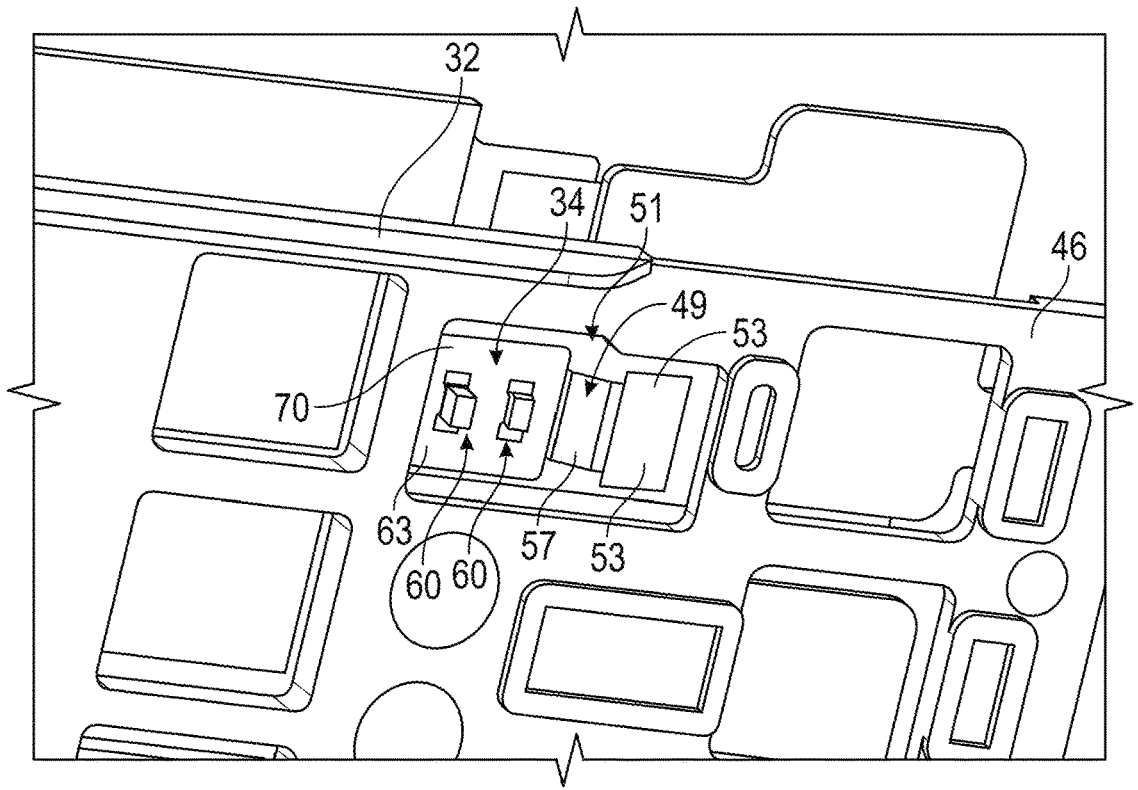
FIG. 7 is a perspective view of a portion of the bus bar carrier of FIG. 4, in accordance with an aspect of the present disclosure.

FIGS. 6 and 7 are perspective views of a portion of the bus bar carrier 32 and flex circuit 34 of FIG. 4. For example, FIG. 6 is an overhead perspective view of the portion of the bus bar carrier 32 and the flex circuit 34, and FIG. 7 is a bottom perspective view of the portion of the bus bar carrier 32 and the flex circuit 34. In FIG. 6, the flex circuit 34 is illustrated as disposed on the upper side 44 of the bus bar carrier 32. The bus bar carrier 32 includes the window 51 through which the temperature sensor welding tab 49 extends. As shown in FIG. 6, the flex circuit 54 includes a notch 61 between two adjacent extensions 63, 65 of the flex circuit 54, where the temperature sensor welding tab 49 is disposed on the first extension 63 of the two extensions 63, 65. A notch 67 may also be disposed on an opposing side of the first extension 63. That is, the first extension 63 may be defined by the two notches 61, 67, and may include a rectangular shape or other suitable shape.

By disposing the temperature sensor welding tab 49 on the first extension 63, the first extension 63 may flex downwardly when the temperature sensor welding tab 49 is welded or otherwise adhered to the terminal end of the electrochemical cell. For example, as shown, the temperature sensor welding tab 49 includes a circuit engagement region 55, the welding region 53, and a transverse region 57 extending transversely between the circuit engagement region 55 and the welding region 53. That is, the temperature sensor welding tab 49 includes a bent plate, where the transverse region 57 is bent relative to the circuit engagement region 55, and the welding region 53 is bent relative to the transverse region 57. In other words, the transverse region 57 extends at a non-right angle relative to the circuit engagement region 55 and the welding region 53 to enable passage of the temperature sensor welding tab 49 from the flex circuit 34 on the upper side 44 of the bus bar carrier 32, through the window 51, and adjacent the underside 46 (see FIG. 7) of the bus bar carrier 32. Further, the bend of the temperature sensor welding tab 49 (e.g., between the transverse region 57 and the circuit engagement region 55, and between the transverse region 57 and the welding region 53) enforces a gap between the terminal end of the electrochemical cell and other components (e.g., thermistors) of, or on, the flex circuit 34.

In FIG. 7, the temperature sensor welding tab 49 is illustrated as extending through the window 51 and being disposed adjacent the underside 44 of the bus bar carrier 32. That is, the welding region 53 is disposed adjacent the underside 44 of the bus bar carrier 32 and may be configured to be welded to the terminal end of an electrochemical cell. Further, in FIG. 7, thermistors 60 are disposed on the flex circuit 34 adjacent to the temperature sensor welding tab 49. For example, the thermistors 60 are disposed on an underside 70 of the first extension 65 of the flex circuit 34. The temperature sensor welding tab 49 may be used, via the coupling (e.g., weld) to the terminal end of the electrochemical cell, to bring the thermistors 60 in close proximity to the terminal end of the electrochemical cell. For example, when the temperature sensor welding tab 49 is coupled to the terminal end of the electrochemical cell, the connection may cause the first extension 63 of the flex circuit 34 to be pulled downwardly, and the thermistors 60 may be disposed on the underside 70 of the first extension 63 of the flex circuit 34. Thus, the thermistors 60 may be pulled toward, or held in close proximity to, the terminal end of the electrochemical cell via the coupling of the temperature sensor welding tab 49 to the terminal end of the electrochemical cell.

In some embodiments, the thermistors 60 may be decoupled from the temperature sensor welding tab 49 but disposed in close proximity to the temperature sensor welding tab 49 (i.e., on the underside 70 of the first extension 63 of the flex circuit 34) to enable the above-described effects. In other embodiments, the thermistors 60 may be electrically coupled to the temperature sensor welding tab 49. Further, the thermistors 60 may be electrically coupled to electrical wiring encapsulated by the polyamide material of the flex circuit 34, and/or running along an underside of the flex circuit 34 between the flex circuit 34 and the bus bar carrier 32. The electrical wiring may then couple to electrical contacts 50 (see FIGS. 4-5), which may be coupled to a processor or other feature of a printed circuit board or battery module control and/or monitoring assembly.

Figure 8:
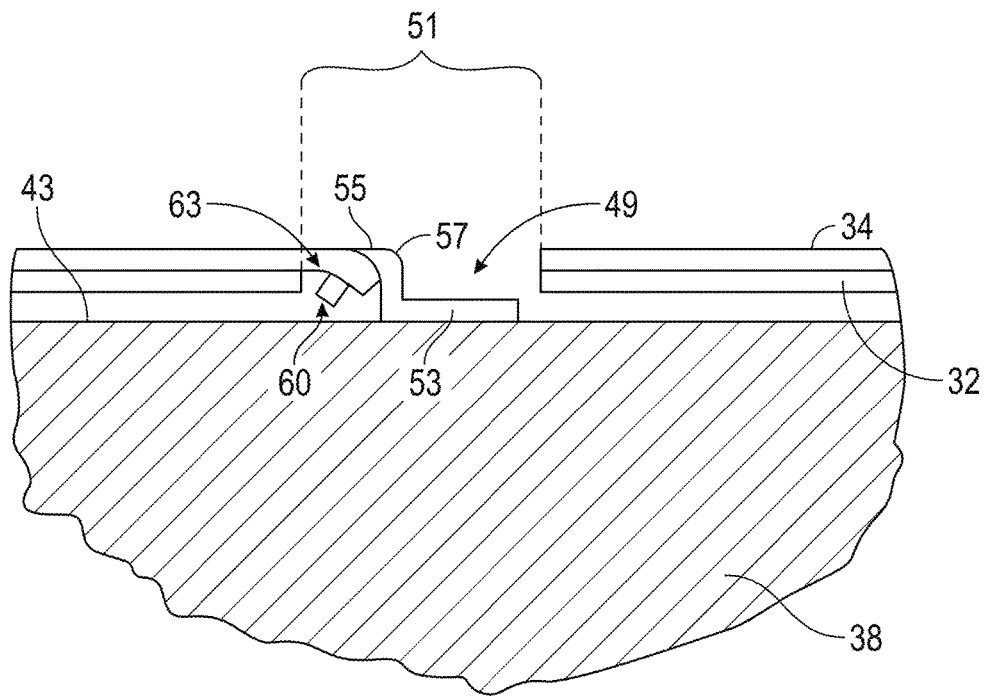
FIG. 8 is a schematic cross-sectional side view of a coupling between a terminal end of an electrochemical cell and a sensor tab disposed on a bus bar carrier, for use in the battery module of FIG. 3, in accordance with an aspect of the present disclosure.

FIG. 8 is a schematic cross-sectional side view of an embodiment of a coupling between the terminal end 43 of an electrochemical cell 38 and the temperature sensor welding tab 49 of the present disclosure. As previously described, the temperature sensor welding tab 49 may include the circuit engagement region 55, the welding region 53, and the transverse region 57 extending between the circuit engagement region 55 and the welding region 53. The transverse region 57 may be bent to form an angle with the welding region 53, and the circuit engagement region 55 may be bent relative to the transverse region 57 to form another angle with the transverse region. By including the transverse region 57 extending at angles relative to the welding region 53 and the circuit engagement region 55, the welding region 53 may fall flat on the terminal end 43 of the electrochemical cell 38. The welding region 53 may be coupled to the terminal end 43 of the electrochemical cell 38 such that at least the transverse region 57 of the temperature sensor welding tab 49 is disposed in the window 51 of the bus bar carrier 32. As shown, a portion (e.g., the first segment 63) of the polyamide material of the flex circuit 34 may also extend into (e.g., overlap with) the window 51 of the bus bar carrier 32, and the thermistors 60 may be disposed on the first segment 63 of the polyamide material of the flex circuit 34. Thus, the temperature sensor welding tab 49, when coupled to the terminal end 43 of the electrochemical cell 38, may cause the first segment 63 of the polyamide material of the flex circuit 34, and the thermistors 60 coupled to the first segment 63, to be drawn toward the terminal end 43 of the electrochemical cell 38. However, in other embodiments, the welding region 53 may fall flat against the terminal end 43 of the electrochemical cell 38 without substantial bending of the first segment 63 of the polyamide material of the flex circuit 34.

Further, the bend of the temperature sensor welding tab 49 (e.g., between the transverse region 57 and the circuit engagement region 55, and between the transverse region 57 and the welding region 53) enforces a gap between the terminal end 43 of the electrochemical cell 38 and other components (e.g., thermistors 60) of, or on, the flex circuit 34. The gap blocks an interference of the electrochemical cell 38 upon the thermistors 60 and/or other components.

The disclosed features of the bus bar carrier 32, the flex circuit 34, the temperature sensor welding tabs 49, and the thermistors 60 may enable improved assembly of the battery module, may reduce a cost of the battery module, and may improve temperature measurements determined by the battery module.

Figure 9:
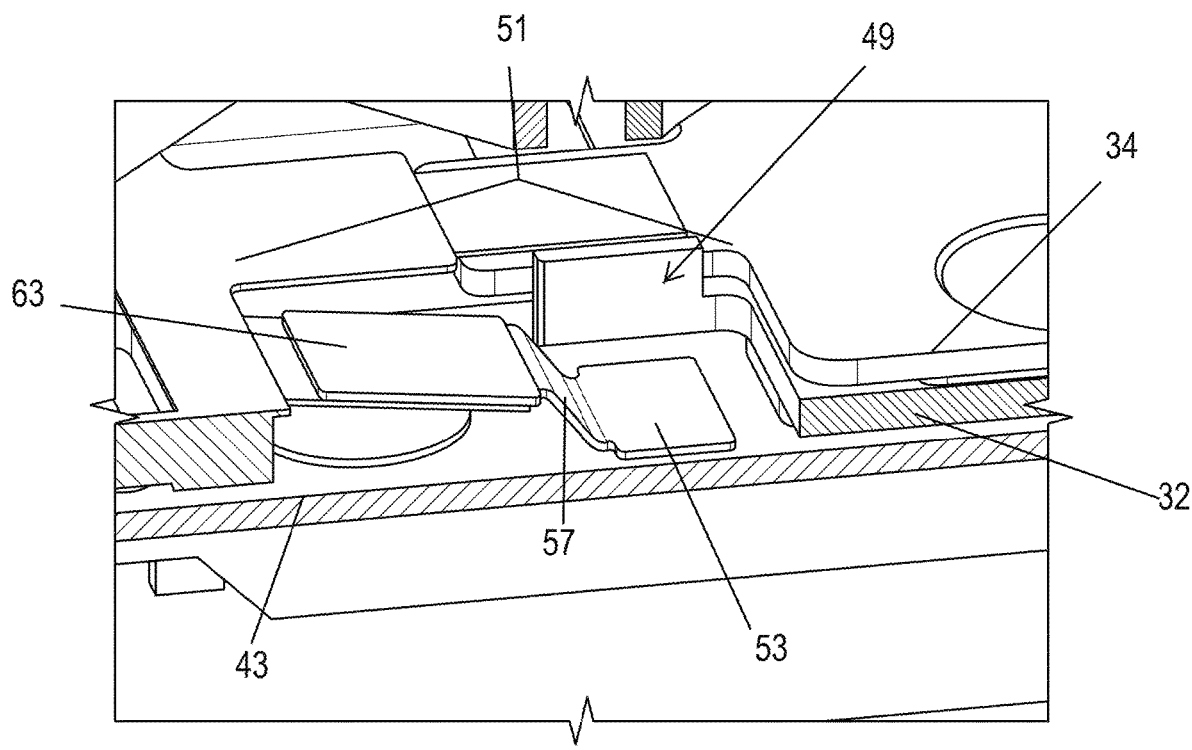
FIG. 9 is another view of a cross-sectional side view of a sensor tab, according to various examples of embodiments.

FIG. 9 is another side view of the bus bar carrier 32 and the flex circuit 34 according to various examples of embodiments. As shown, the sensor tab or temperature sensor welding tab 49 includes a welding region 53. The welding region 53 may be welded or otherwise adhered to, for example, a terminal end of an electrochemical cell 43 disposed underneath the bus bar carrier 32. Between a first region or circuit engagement region 55 to a second region or welding region 53 is a third region or transverse region 63. Thus, the first region or circuit engagement region 55 may be relatively above the second region or welding region 53 when the battery is positioned such that bus bar carrier 32 is above battery cell 43. It should be understood second region or welding region 53 is coupled or welded to battery module 43 in various examples of embodiments, which may be understood to allow for sufficient electrical connection to measure battery cell temperature. In various embodiments, the sensor tab 49 may be relatively thin. For example, the tab may be less than 1 mm thick, between 0.1-0.9 mm thick, between 0.25-0.75 mm thick, and more particularly approximately 0.33 mm thick.

The disclosed sensor welding tab, for example but not limited to a temperature sensor welding tab, and battery module may have various advantages, particularly to manufacturability. In various embodiments, the disclosed may allow for ease of assembly and connection of the sensors to the battery modules. As another non-limiting example, the thickness of the tab may have advantages to heat conduction for measurement of temperature, as well as advantages to assembly.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present disclosure.

While particular examples of embodiments are outlined above, various alternatives, modifications, variations, improvements and/or substantial equivalents, whether known or that are or may be presently foreseen, may become apparent to those having at least ordinary skill in the art. Accordingly, the examples of embodiments as set forth above are intended to be illustrative, not limiting. Various changes may be made without departing from the spirit or scope of the disclosure. Therefore, the disclosure is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
    a plurality of electrochemical cells including a first electrochemical cell having a terminal end;
    a bus bar carrier configured to interface bus bars with terminals of the plurality of electrochemical cells;
    a flex circuit disposed on the bus bar carrier;
    a window provided on the bus bar carrier and configured to enable the flex circuit physical access to the first electrochemical cell; and
    a temperature sensor welding tab of the flex circuit, wherein the temperature sensor welding tab comprises a temperature sensor, a circuit engagement region coupled to the flex circuit, a welding region coupled to the terminal end of the first electrochemical cell, and a transverse region extending through the window of the bus bar carrier and between the circuit engagement region and the welding region.

2. The battery module of claim 1, wherein the welding region is coupled to the terminal end of the first electrochemical cell by welding.

3. The battery module of claim 1, wherein the temperature sensor is a thermistor.

4. The battery module of claim 1, wherein the temperature sensor is a first temperature sensor and the temperature sensor welding tab comprises a second temperature sensor.

5. A battery module, comprising:
    a first electrochemical cell;
    a circuit comprising a flex circuit;
    a sensor welding tab including a temperature sensor, the tab having a first region coupled to the circuit and a second region directly coupled to the first electrochemical cell by welding; and
    a bus bar carrier having a window, the circuit provided on the bus bar carrier, wherein the window is configured to enable the circuit physical access to the first electrochemical cell and the sensor welding tab extends through the window.

6. The battery module of claim 5, wherein the circuit is disposed of on a bus bar carrier having a bottom surface.

7. The battery module of claim 6, wherein the sensor welding tab second region is disposed below a bottom surface of the bus bar carrier.

8. The battery module of claim 5, wherein the sensor welding tab comprises a third region extending transversely between the first region and the second region.

9. The battery module of claim 5, wherein the first electrochemical cell is disposed at least partially below the bus bar carrier.

10. The battery module of claim 5, wherein the temperature sensor is a first temperature sensor and the sensor welding tab comprises a second temperature sensor.

11. The battery module of claim 5, wherein the temperature sensor is a thermistor.

12. A battery module, comprising:
    an electrochemical cell;
    a bus bar carrier;
    a circuit disposed on the bus bar carrier, the circuit comprising a flex circuit;
    a window provided on the bus bar carrier and configured to enable the circuit physical access to the electrochemical cell; and
    a sensor welding tab having a temperature sensor, the tab comprising a circuit engagement region coupled to the circuit, a welding region coupled to the electrochemical cell, and a transverse region extending through the window of the bus bar carrier and between the circuit engagement region and the welding region.

13. The battery module of claim 12, wherein the electrochemical cell comprises a terminal end and the welding region is coupled to the terminal end of the electrochemical cell.

14. The battery module of claim 12, wherein the sensor welding tab is a temperature sensor welding tab.

15. The battery module of claim 12, wherein the welding region is welded to the electrochemical cell.

* * * * *